US 8,380,840 B2
Feb. 19, 2013

(12) United States Patent
Vijay

(10) Patent No.: US 8,380,840 B2
(45) Date of Patent: Feb. 19, 2013

(54) METHOD FOR RECORDING EVENTS IN AN IP NETWORK

(75) Inventor: Sharadha Vijay, Cedar Rapids, IA (US)

(73) Assignee: Verizon Business Global LLC, Basking Ridge, NJ (US)

(*) Notice: Subject to any disclaimer, the term of this patent is extended or adjusted under 35 U.S.C. 154(b) by 2168 days.

(21) Appl. No.: 10/023,297

(22) Filed: Dec. 17, 2001

(65) Prior Publication Data
US 2003/0126257 A1 Jul. 3, 2003

(51) Int. Cl.
G06F 15/173 (2006.01)
(52) U.S. Cl. .......................................... 709/224
(58) Field of Classification Search .................. 709/230, 709/227, 224, 246; 379/88.22; 715/513
See application file for complete search history.

(56) References Cited

U.S. PATENT DOCUMENTS

| | | | |
|---|---|---|---|
| 4,979,207 A | 12/1990 | Baum et al. |
| 5,027,388 A | 6/1991 | Bradshaw et al. |
| 5,565,316 A | 10/1996 | Kershaw et al. |
| 5,579,379 A | 11/1996 | D'Amico et al. |
| 5,812,668 A | 9/1998 | Weber |
| 5,827,070 A | 10/1998 | Kershaw et al. |
| 5,867,495 A | 2/1999 | Elliott et al. |
| 6,016,343 A | 1/2000 | Hogan et al. |
| 6,122,359 A | 9/2000 | Otto et al. |
| H1897 H | 10/2000 | Fletcher et al. |
| 6,134,307 A | 10/2000 | Brouckman et al. |
| 6,151,624 A | 11/2000 | Teare et al. |
| 6,233,248 B1 | 5/2001 | Sautter et al. |
| 6,282,193 B1 | 8/2001 | Hluchyj et al. |
| 6,311,186 B1 | 10/2001 | MeLampy et al. |
| 6,377,672 B1 | 4/2002 | Busuioc |
| 6,377,939 B1 | 4/2002 | Young |
| 6,418,467 B1 | 7/2002 | Schweitzer et al. |
| 6,490,564 B1 | 12/2002 | Dodrill et al. |
| 6,499,054 B1 | 12/2002 | Hesselink et al. |
| 6,577,718 B1 | 6/2003 | Kalmanek et al. |
| 6,611,818 B1 | 8/2003 | Mersky et al. |
| 6,631,186 B1 | 10/2003 | Adams et al. |
| 6,639,975 B1 | 10/2003 | O'Neal et al. |
| 6,707,915 B1 | 3/2004 | Jobst et al. |
| 6,714,992 B1 | 3/2004 | Kanojia et al. |

(Continued)

FOREIGN PATENT DOCUMENTS

EP 1202528 5/2002
WO 00/52916 9/2000

(Continued)

OTHER PUBLICATIONS

Usdin et al., "XML: Not a Silver Bullet, but a Great Pipe Wrench", StandardView, Sep. 1998, vol. 6, No. 3, pp. 125.

(Continued)

Primary Examiner — David Eng

(57) ABSTRACT

The present invention relates to a method for capturing call events and other information in a platform independent way. The method includes generating call event records in response to a SIP call events. A call event file is created that includes all the call event records collected by a server over a predetermined period of time. The call event file is an XML document that includes generic, uniformly formatted records that can be read by any network device equipped with an XML parser. XML documents include embedded instructions that enable a receiving computer to decode the records without needing a special proprietary interface.

41 Claims, 3 Drawing Sheets

U.S. PATENT DOCUMENTS

| | | | |
|---|---|---|---|
| 6,718,023 B1 | 4/2004 | Zolotov | |
| 6,751,652 B1 | 6/2004 | Thomas | |
| 6,768,722 B1 | 7/2004 | Katseff et al. | |
| 6,865,681 B2 | 3/2005 | Nuutinen | |
| 6,870,845 B1 | 3/2005 | Bellovin et al. | |
| 6,895,438 B1 * | 5/2005 | Ulrich | 709/227 |
| 6,907,032 B2 | 6/2005 | Eastman | |
| 6,952,800 B1 | 10/2005 | Danner et al. | |
| 6,980,526 B2 * | 12/2005 | Jang et al. | 370/260 |
| 7,058,704 B1 | 6/2006 | Mangipudi et al. | |
| 7,076,040 B2 | 7/2006 | Carson et al. | |
| 7,136,467 B2 | 11/2006 | Brockman et al. | |
| 7,197,560 B2 | 3/2007 | Caslin et al. | |
| 7,305,081 B1 | 12/2007 | Kalmanek et al. | |
| 7,406,306 B2 | 7/2008 | Gallant et al. | |
| 2001/0012346 A1 | 8/2001 | Terry | |
| 2001/0050984 A1 | 12/2001 | Jordan | |
| 2002/0010798 A1 | 1/2002 | Ben-Shaul et al. | |
| 2002/0064149 A1 | 5/2002 | Elliott et al. | |
| 2002/0090071 A1 | 7/2002 | Book et al. | |
| 2002/0095339 A1 | 7/2002 | Galloway | |
| 2002/0103898 A1 | 8/2002 | Moyer et al. | |
| 2002/0112187 A1 | 8/2002 | Dalton et al. | |
| 2002/0123919 A1 | 9/2002 | Brockman et al. | |
| 2002/0124100 A1 | 9/2002 | Adams | |
| 2002/0126654 A1 | 9/2002 | Preston et al. | |
| 2002/0127995 A1 | 9/2002 | Faccinn et al. | |
| 2002/0129093 A1 | 9/2002 | Donovan et al. | |
| 2002/0129236 A1 | 9/2002 | Nuutinen | |
| 2002/0160810 A1 | 10/2002 | Glitho et al. | |
| 2002/0188712 A1 | 12/2002 | Caslin et al. | |
| 2003/0009557 A1 | 1/2003 | Carson et al. | |
| 2003/0074313 A1 | 4/2003 | McConnell et al. | |
| 2003/0079223 A1 | 4/2003 | Galloway | |
| 2003/0126257 A1 | 7/2003 | Vijay | |
| 2004/0078349 A1 | 4/2004 | Syrjala et al. | |
| 2007/0116232 A1 | 5/2007 | Sprokkereef | |
| 2007/0206576 A1 | 9/2007 | Radulovic | |
| 2008/0013531 A1 | 1/2008 | Elliott et al. | |
| 2008/0025295 A1 | 1/2008 | Elliott et al. | |

FOREIGN PATENT DOCUMENTS

| | | |
|---|---|---|
| WO | WO 02075559 A1 | 9/2002 |

OTHER PUBLICATIONS

Handley et al., "SIP: Session Initiation Protocol", IETF, Request for Comment 2543, Mar. 1999.

Schulzrinne et al., "SIP Call Control Services", IETF Internet Draft, Jun. 17, 1999.

Schulzrinne et al., "Signaling for Internet Telephony," Columbia University, Department of Computer Science Technical Report CUCS-005-98,Jan. 31, 1998.

Cisco Systems, "Release Note for Cisco MC3810—Software Requirement for Analog Personality Modules," Document No. 78-6053-01, 1998.

Lennox at al., "Implementing Intelligent Network Services with the Session Initiation Protocol," Columbia University Technical Report CUCS-002-99, Jan. 1999.

Polyzois et al., "From POTS to PANS—A Commentary on the Evolution to Internet Telephony," Mar. 26, 1999.

Sterman, "Real-Time Billing in SIP," DeltaThree, 2002, www.recursosvoip.com/docs/english/realtimebilling.pdf, 18 pages.

Kausar, Nadia, at al., "A Charging Model for Sessions on the Internet," Proceedings of the Fourth IEEE Symposium on Computers and Communications, pp. 32-38: Apr. 1999.

Aboda et al., "The Accounting Data Interchange Format (ADIF)," ROAMOPS Working Group, Apr. 25, 2000.

Pan et al., "DIAMETER: Policy and Accounting Extension for SIP (draft-pan-diameter-sip-01)," The Internet Society, Nov. 15, 1998.

Brownlee et al., "RFC 2924—Accounting Attributed and Record Formats," The Internet Society, Sep. 2000.

Cisco Systems, "Overview of the Session Initiation Protocol,"www.cisco.com/univered/c/td/doc/product/coice/sipsols/biggulp/bisipov.htm, 1992.

* cited by examiner

METHOD FOR RECORDING EVENTS IN AN IP NETWORK

BACKGROUND OF THE INVENTION

1. Field of the Invention

The present invention relates generally to telecommunications systems, and particularly to recording call event records in an IP network.

2. Technical Background

Telephony over the Internet is rapidly becoming a reality. Features that callers have come to expect from circuit switched systems are also considered essential for IP networks. One approach that is being considered to provide the system features needed to create and terminate calls in an IP network involves the Session Initiation Protocol (SIP).

SIP is an application-layer signaling protocol that has been developed to create, modify, and terminate sessions having one or more users. These sessions include Internet telephone calls, multi-media conferences, and multi-media distribution. SIP functionality is typically resident on application servers. SIP servers are configured to provide telephonic services, and process call event information. Because vendors have developed their own custom SIP application programs, call events and telephonic services are processed by each vendor's application server in a proprietary way. Unfortunately, when a network includes elements provided by a multiplicity of vendors, it becomes necessary to accommodate a variety of proprietary interfaces that enable the devices to transmit and receive call event information, billing information, monitoring information, fraud prevention data and other data.

What is needed is a platform independent method for capturing SIP related events and other data in a uniform manner. Preferably, the system and method will be extensible, providing embedded information that will enable a receiving computer to read the generic, uniformly formatted records without needing a special proprietary interface.

SUMMARY OF THE INVENTION

The present invention relates to a platform independent method for capturing SIP related events and other data in a uniform manner. The method and system of the present invention is extensible. The method of the present invention produces generic, uniformly formatted records that can be read by a receiving computer without needing a special proprietary interface.

One aspect of the present invention is a method for capturing call event data in a telecommunications network. The method includes generating at least one call event record in response to at least one event. An XML call event file is created that includes the at least one call event record.

In another aspect, the present invention includes a computer readable medium that can be used to direct a Session Initiation Protocol (SIP) server computer to function in a specified manner. The computer readable medium includes a SIP application layer software module. The SIP application layer software module is executable by the SIP server computer to provide SIP functionality. A call event record module is coupled to the SIP application layer software module. The call event record module is configured to create at least one call event record in response to at least one event. An XML processor module is coupled to the call event record module. The XML processor module is configured to create an XML call event file. The XML call event file includes the at least one call event record.

In another aspect, the present invention includes a set of application program interfaces embodied on a computer readable medium for execution on a computer. The set of application program interfaces includes a first interface that receives an event identifier and returns a call event record. The set of interfaces includes a second interface that receives a set of call event records and returns a call event file. The call event file includes the set of call event records. The call event file is an XML document written using the Extensible Markup Language (XML).

In another aspect, the present invention includes a set of application program interfaces embodied on a computer readable medium for execution on a Session Initiation Protocol (SIP) server computer in conjunction with a SIP application layer software module that provides SIP functionality. The set of application program interfaces includes a first interface that receives a SIP event identifier and returns a call event record. The set of interfaces includes a second interface that receives a set of call event records and returns a call event file. The call event file includes the set of call event records. The call event file is written using the Extensible Markup Language (XML) and the call event file is an XML document.

In another aspect, the present invention includes a communications network for establishing a communications session between a first client and a second client. The communications network includes at least one Session Initiation Protocol (SIP) server computer. The SIP server computer includes a first call event record module configured to create a call event record corresponding to an event, and a first XML processor module configured to create a first XML call event file, the first XML call event file including the call event record. At least one network system is coupled to the at least one SIP server computer. The at least one network system includes a second XML processor module, whereby the at least one network system can read the first XML call event file.

In another aspect, the present invention includes a computer-readable medium having stored thereon a data structure formatted as an XML document file. The data structure includes a server identifier section including information identifying the server that created the XML document file, a SIP message type section, and a SIP event section including information relating to a SIP message event.

In another aspect, the present invention includes a computer readable medium having computer executable instructions for performing a method. The method includes the steps of: generating at least one call event record in response to at least one event; and, creating an XML call event file including the at least one call event record.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
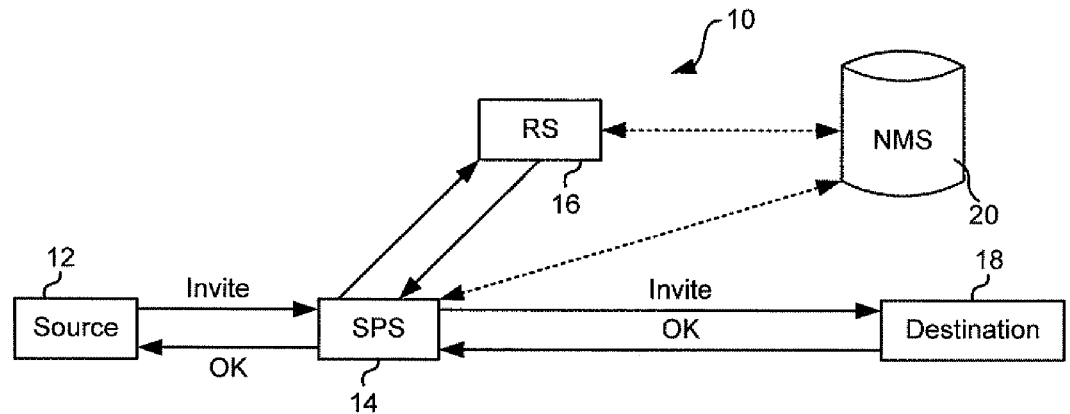
FIG. 1 is a block diagram of a communications network for establishing a communications sessions between a first user and a second user in accordance with the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the communications network of the present invention is shown in FIG. 1, and is designated generally throughout by reference numeral 10.

In accordance with the invention, the present invention relates to a method for capturing call related events and messages in a telecommunications network. The method includes the step of generating a call event record in response to a call related event. A call event file is created that includes the call event record. The call event file is an XML document file. Thus, the method of the present invention is extensible and platform independent. The method captures call related SIP events and other data such that any application server can process the data in a uniform way. The present invention provides a method for providing generic, uniformly formatted records that can be read by any network device. The system and method of the present invention includes embedded instructions that enable a receiving computer to decode the records without needing a special proprietary interface.

As embodied herein, and depicted in FIG. 1, a block diagram of a communications network for establishing a communications sessions between a first client and a second client in accordance with the present invention is disclosed. IP network 10 includes source client 12 coupled to SIP proxy server (SPS) 14. Client 12 is referred to as a source client because it is the originator of the session participation request. Server 14 is coupled to SIP redirect server (RS) 16, destination client 18 and network management system (NMS) 20. Those of ordinary skill in the art will recognize that FIG. 1 is merely a representative example. The present invention supports networks including a multiplicity of devices such as voice mail servers, conferencing servers and gateway devices.

By way of example, source client 12 initiates a call attempt to destination client 18 by transmitting an INVITE request to SPS 14. SPS 14 acts as a proxy by relaying the INVITE message to client 18. If client 18 is available, client 18 transmits an OK message to client 12 via SPS 14. On the other hand, if SPS 14 does not recognize the IP address of client 18, SPS 14 may forward an INVITE message to RS 16. Subsequently, SPS 14 receives an alternative IP address for destination client 18 and provides that address to source client 12. Client 12 retransmits an INVITE message to client 18 using the address provided by RS 16. The above described transactions are conducted using SIP request messages and SIP response messages which are also referred to as call events. The application servers record each call event in a call event record. All of the call event records produced over a predetermined amount of time are compiled in a Call Event Record file (CER file). The CER file is subsequently transmitted to NMS 20. Network status changes, fault conditions, and billing data, in addition to call event records can also be reported to NMS 20 via the CER files. In this way, billing, troubleshooting, testing, and other back office functions resident in NMS 20 have access to the CER files.

Figure 2:
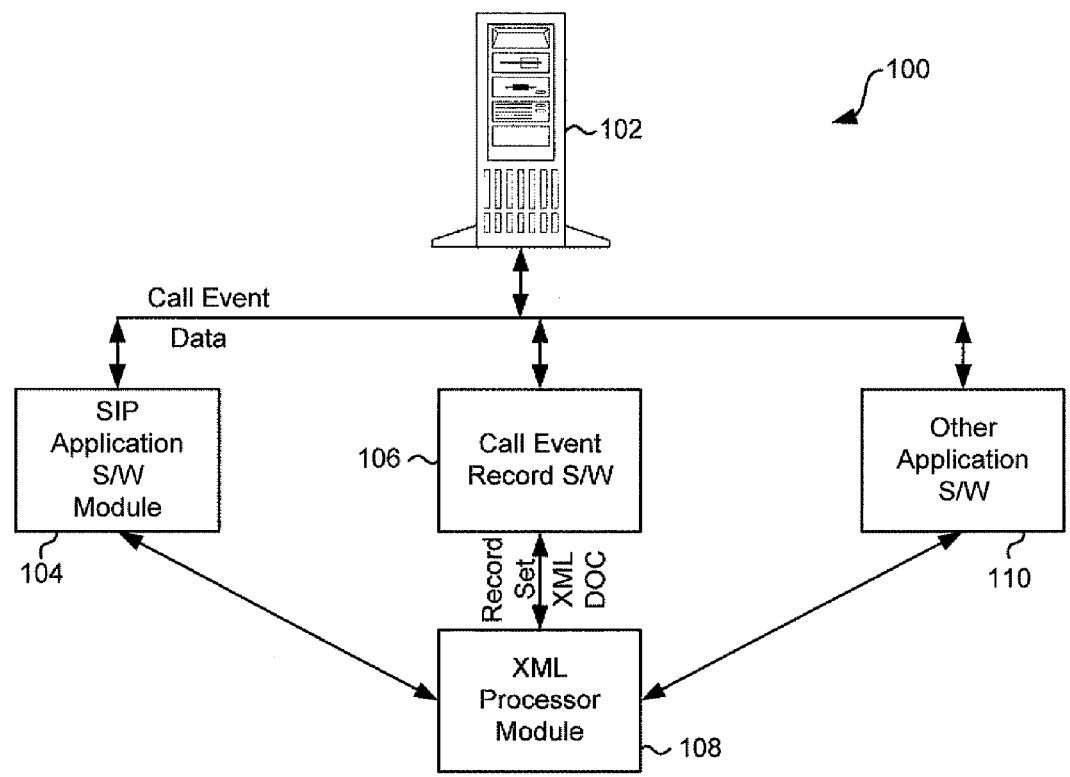
FIG. 2 is a block diagram of a SIP server in accordance with the present invention.

As embodied herein, and depicted in FIG. 2, a block diagram of SIP server 100 in accordance with the present invention is disclosed. Server 100 includes SIP application software module 104 disposed in the memory of server computer 102. The memory of server computer 102 also includes call event record module 106 and other application software modules 110. SIP application software 104 provides SIP functionality. Call Event Record module 106 creates call event records in response to SIP call events or other events. XML processor 108 reads XML documents providing access to their content and structure. XML processor 108 does its work on behalf of application software modules. SIP application software modules 104 disposed in SPS 14 and RS 16, respectively, can be written as proprietary application software on different hardware platforms as long as each server includes an XML processor.

Referring back to FIG. 2, module 104, module 106, module 108, and modules 110 work together by way of a set of application program interfaces. One important interface receives call event information from SIP module 104 and provides it to Call Event Record module 106. Another important interface receives a set of call event records from Call Event Record module 106 and returns a Call Event Record (CER) file from module 108. The CER file includes the set of call event records collected by module 16 over a predetermined period of time.

Figure 3:
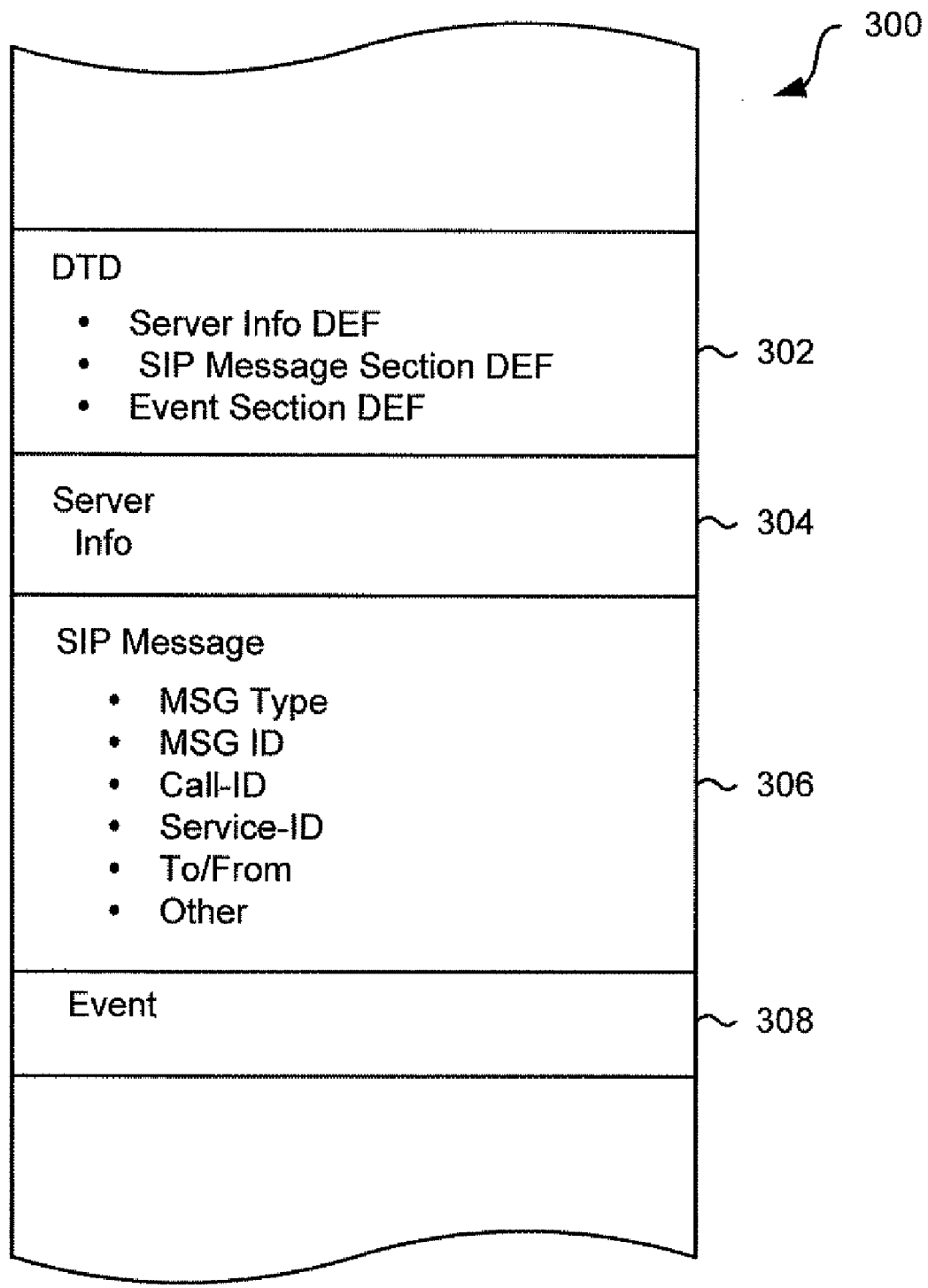
FIG. 3 is a diagrammatic depiction of the structure of a Call Event Record XML file.

As embodied herein, and depicted in FIG. 3, a diagrammatic depiction of the structure of CER file 300 in accordance with the present invention is disclosed. The CER file is an XML document. As discussed above, the XML document is the data exchange mechanism between different proprietary systems—whether they be applications, databases, or browsers. XML documents include storage units known as entities which contain parsed data and unparsed data. Parsed data includes "markup," which is used to encode a description of the documents storage layout and logical structure. The self describing feature of XML is one of its most important attributes—extensibility. When the application produces data, the XML processor is called to create an XML document having specific "tags." A tag is a string of unparsed data bracketed by delimiting punctuation. The XML processor in the receiving server parses the received XML document to determine the storage layout and logical structure of the XML document. However, the interpretation of the data is left to the application that calls XML processor 108.

Referring back to FIG. 3, CER file 300 has the following structure. It includes an XML document type declaration (DTD) section 302, server information section 304, SIP message type section 306, and event information section 308. DTD 302 provides a way of capturing the rules a designer adds to extend the core rules of XML syntax to thereby create a vocabulary to describe a particular event or situation. DTD section 302 also provides a way for an XML processor to unambiguously validate a particular XML document. DTD 302 provides data to describe the data in the tags. They describe the relationship between the tags found in the document, what attributes the tags are supposed to have, what attributes are default, and what values are mandatory. The XML processor module interprets DTD 302 accompanying the received XML document before providing the data to the application program.

Server information section 304 identifies the creator of CER file 300. This section appears only once in CER file 300. Since a particular server may provide specific services such as conferencing, instant messaging (IM), or voice mail, the service description as well as vendor information is provided by this section.

SIP message type section 306 appears for each call event record. This section 306 includes a message identifier field that identifies the exact type of message, e.g., whether it is an INVITE or a 200 OK message. SIP message type section 306 also includes a CALL-ID field which provides the CALL-ID header associated with a particular SIP message. SIP message type section 306 includes a service ID field that uniquely identifies the service instance associated with the SIP message. For example, if the application server is providing conferencing services, the service ID field identifies the particular conference corresponding to the SIP message. This allows one to obtain all messages exchanged during a specific conference within a specific time period. In another example, if the server is a voice mail system, the service ID would identify a particular voice mail box. In yet another example, the service ID would link together all messages and events for a given call established by a proxy server. SIP message type section 306 also includes a To/From field that records the IP address and port number of both the originating and receiving servers. In another embodiment, only one or the other will be present in this field. Finally, SIP message type section 306 includes an "other messages" field. This field records other portions of a SIP message deemed necessary depending on the type of server making the call event record. This information may include additional headers or it may be the actual message body of the SIP message.

CER file 300 also includes an Event Information Section 308 for each record. Event Information Section 308 records other events encountered in processing a particular SIP message. These other events include "INVITE TIMEOUT," "NON-INVITE TIMEOUT," "CONNECTION ERROR," "AUTHENTICATION PERFORMED," "FIND-ME FEATURE INVOKED," "DAP query sent," and etc. There may also be additional fields containing detailed information about an event. Of course, any modifications to this field will be defined in the DTD section.

Figure 4:
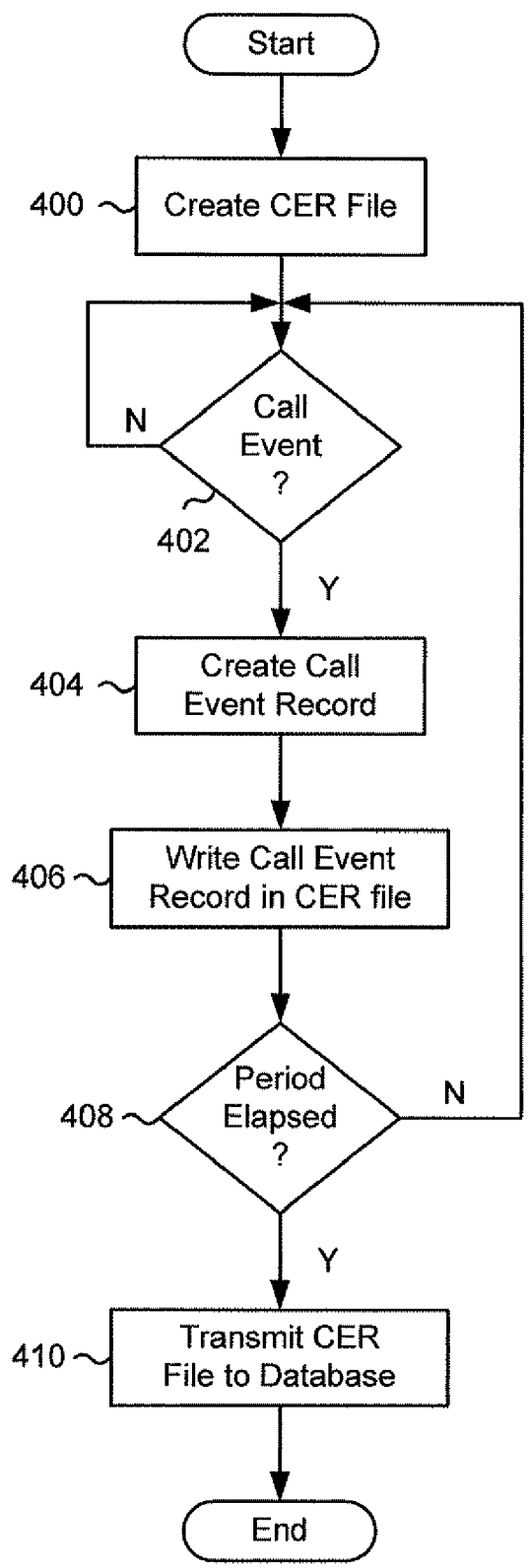
FIG. 4 is a chart showing a method for recording call events in accordance with the present invention.

As embodied herein, and depicted in FIG. 4, a chart showing a method for recording call events in accordance with the present invention is disclosed. In step 400, the application server creates CER file 300. The length of the file is configurable, that is, call event records and other data are written into the CER files for a predetermined period of time. After the time period elapses, a new CER file is started and the old file is archived by NMS 20. In step 402 the application server determines if there is a call event, such as an INVITE, or some other such SIP message event. If so, the application server creates a call event record (step 404). Subsequently, the XML processor is called and the call event record is written in the CER file using XML (step 406). In step 408, the application server determines if the configurable file time period has elapsed. If not, the process flow returns to step 402 and the application server waits for another call event to record. If the time period has elapsed, the CER XML document file is transmitted to NMS 20 (step 410) (See FIG. 1).

Those of ordinary skill in the art will recognize that CER files can be employed for any events occurring within network 10. Calls placed between all or any combinations of SIP-phones, enterprise gateways, network gateways, DAL gateways, INCP gateways, SIP-voicemail servers, and SIP conferencing servers may employ the present invention. Those of ordinary skill in the art will also recognize that the present invention can be employed using any suitable type of transport network. Further, the present invention is applicable to any type of session that may be established including, but not limited to, telephony, video, audio, instant messaging, and etcetera. It is also contemplated that the present invention may be employed for billing, monitoring, management, or for any of a wide variety of services performed by the network.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method comprising:
receiving, by a Session Initiation Protocol (SIP) server, first call event information, associated with a first call event, from a first module, the first call event information from the first module being processed by the first module using a first type of proprietary application;
receiving, by the SIP server, second call event information, associated with a second call event, from a second module, the second call event information from the second module being processed by the second module using a second type of proprietary application, the second type of proprietary application being different from the first type of proprietary application;
converting, by the SIP server, the first call event information from a first format associated with the first type of proprietary application into a first Extensible Markup Language (XML) document to generate a first call event record for the first call event information;
converting, by the SIP server, the second call event information from a second format associated with the second type of proprietary application into a second XML document to generate a second call event record for the second call event information;
creating, by the SIP server, an XML call event file based on the first XML document and the second XML document, creating the XML call event file including:
generating a first section that includes data identifying relationships associated with one or more tags included in the XML call event file,
generating a second section that includes data identifying the SIP server,
generating third section that identifies a type of a first message associated with the first call event and a type of a second message associated with the second call event record, and
generating a fourth section that includes information associated with a processing of the first message and information associated with a processing of the second message; and
monitoring, by the SIP server, network traffic associated with the SIP server based on the XML call event file using a third type of proprietary application that is different than the first type of proprietary application and the second type of proprietary application.

2. The method of claim 1, where the SIP server comprises a SIP proxy server.

3. The method claim 1, where the SIP server comprises a SIP redirect server.

4. The method of claim 1, where the first module is included in a voice mail server and the second module is included in a gateway device, the method further comprising:
providing a voice mail service based on receiving the first call event information.

5. The method of claim 1, where the first call event information and the second call event information are received during a particular time period, the method further comprising:
determining an expiration of the particular time period;
determining, based on the first XML document and the second XML document, that the first call event and the second call event occurred during the particular time period; and
creating, based on determining the expiration of the particular time period and determining that the first call event and the second call event occurred during the particular time period, the XML call event file.

6. The method of claim 4, where the SIP server and the voice mail server are included in a local area network (LAN).

7. The method of claim 1, where the first call event comprises receiving a SIP invite request, the method further comprising:
relaying the SIP invite request to a first device to establish a SIP session between the first device and a second device based on the SIP invite request.

8. The method of claim 7, where the second call event comprises receiving a response to the SIP invite request, the method further comprising:
relaying the response to the SIP invite request, to the first device, based on the SIP invite request.

9. The method of claim 1, where the first call event comprises receiving an SIP invite message and the second call event comprises receiving a SIP redirection message, the method further comprising:
determining that an Internet Protocol (IP) address included in the SIP invite message is not recognized by the SIP server;
forwarding the SIP invite message to a redirection server based on determining that the IP address included in the SIP invite message is not recognized by the SIP server; and
receiving an alternate IP address from the redirection server based on forwarding the SIP invite message; and
transmitting the SIP redirection message to a source device to provide the alternate IP address to the source device.

10. The method of claim 1, where one of the first call event or the second call event comprises receiving a SIP proxying request.

11. The method of claim 1, where one of the first call event or the second call event comprises receiving a SIP proxying response message.

12. The method of claim 1, where one of the first call event or the second call event comprises receiving a SIP error message.

13. The method of claim 1, where one of the first call event or the second call event is associated with a network fault condition.

14. The method of claim 1, where one of the first call event or the second call event comprises receiving billing information or transmitting billing information.

15. The method of claim 1, where one of the first call event or the second call event comprises an event related to network monitoring.

16. The method of claim 1, where the second section of the XML call event file includes a server information tag that identifies the SIP server, where monitoring the network traffic includes:
determining, based on the first section of the XML call event file, a description of data associated with the server information tag; and
identifying, based on the determined description of the data associated with the server information tag, an originating server associated with the first call event or the second call event.

17. The method of claim 1, where the first type of message comprises a SIP request and the second type of message comprises a SIP response, the method further comprising:
establishing a SIP session based on the first call event and the second call event.

18. The method of claim 1, where the third section includes a service identifier field, the service identifier field uniquely identifying a service associated with a SIP message that corresponds to one of the first call event or the second call event.

19. The method of claim 1, where the third section includes a send/receive field that includes an Internet Protocol (IP) address associated with a calling party and an IP address associated with a called party.

20. The method of claim 1, where the third section includes a message content field that includes additional information associated with the first message or the second message.

21. The method of claim 1, where the XML call event file includes an event field identifying the first call event and the second call event.

22. The method of claim 1, where the first section provides information that allows the XML call event file to be decoded, the method further comprising:
decoding the XML call event file based on the information that allows the XML call event file to be decoded; and
monitoring the network traffic based on decoding the XML call event file.

23. A Session Initiation Protocol (SIP) server computer comprising:
a first SIP application layer software module, the first SIP application layer software module being executable by the SIP server computer to provide SIP functionality utilizing a first proprietary application;
a second SIP application layer software module, the second SIP application layer software module being executable by the SIP server computer to provide SIP functionality utilizing a second proprietary application that is different from the first proprietary application;
a call event record module coupled to the first SIP application layer software module and the second SIP application layer software module, the call event record module to:
create a call event record, based on the first proprietary application, for each call event, of one or more call events, associated with the SIP server computer;
an Extensible Markup Language (XML) processor module coupled to the call event record module, the XML processor module to:
generate, for each created call event record, an XML document;
create an XML call event file, the XML call event file including each generated call event record, each generated call event record including a tag comprising a string of unparsed data that is bracketed by delimiting punctuation, when creating the XML call event file, the XML processor module being to:
generate an XML document type declaration section that includes data identifying one or more relationships associated with the tag included in each generated call event record included in the XML call event file,
generate a server information section that includes data associated with the SIP server computer, generate, for each created call event record, a SIP message type section that identifies a type of a message associated with the created call event record, and generate, for each created call event record, an event information section that includes information associated with a processing of the message associated with the created call event record; and a third module, the third module being executable by the SIP server computer to monitor network traffic associated with the SIP server computer based on the XML call event file using a third proprietary application that is different from the first proprietary application and the second proprietary application.

24. The SIP server computer of claim 23, where the SIP server computer comprises a SIP proxy server.

25. The SIP server computer of claim 23, where the SIP server computer comprises a SIP redirect server.

26. The SIP server computer of claim 23, where one of the one or more call events is associated with a SIP invite request message, and where the SIP server computer executes the first SIP application layer software module to utilize the first proprietary application to establish a SIP session between a source device and a destination device based on the SIP invite request message.

27. The SIP server computer of claim 23, where one of the one or more call events is associated with a response to a SIP invite request message, and where the SIP server computer executes the first SIP application layer software module to utilize the first proprietary application to establish a SIP session between a source device and a destination device based on the response to the SIP invite request message.

28. The SIP server computer of claim 23, where one of the one or more call events is associated with a SIP redirection message, and where the SIP server computer executes the first SIP application layer software module to utilize the first proprietary application to establish a SIP session between a source device and a destination device based on the SIP redirection message.

29. The SIP server computer of claim 23, where one of the one or more call events is associated with a SIP proxying request message, and where the SIP server computer executes the first SIP application layer software module to utilize the first proprietary application to establish a SIP session between a source device and a destination device based on the SIP proxying request message.

30. The SIP server computer of claim 23, where one of the one or more call events is associated with a SIP proxying response message, and where the SIP server computer executes the first SIP application layer software module to utilize the first proprietary application to establish a SIP session between a source device and a destination device based on the SIP proxying response message.

31. The SIP server computer of claim 23, where one of the one or more call events is associated with an error message, and where the SIP server computer executes the third SIP application layer software module to:

manage services provided by the first SIP application layer software module or the second SIP application layer software module based on the XML call event file.

32. The SIP server computer of claim 23, where one of the one or more call events is associated with a network fault condition, and where the SIP server computer executes the third SIP application layer software module to:

manage services provided by the first SIP application layer software module or the second SIP application layer software module based on the XML call event file.

33. The SIP server computer of claim 23, where one of the one or more call events is associated with a transmission of billing information or a reception of billing information, and where the SIP server computer executes the third SIP application layer software module to:

prepare a bill based on the XML call event file.

34. The SIP server computer of claim 23, where one of the one or more call events comprises a call event related to network monitoring, and where the SIP server computer executes the third SIP application layer software module to:

monitor a network associated with the SIP functionality provided by the first SIP application layer software module based on the XML call event file.

35. The SIP server computer of claim 23, where the XML call event file includes a server information tag that identifies an originating server associated with each call event, of the one or more call events, and where the SIP server computer executes the third SIP application layer software module to:

determine, based on the XML document type declaration section, that the server information tag identifies the originating server.

36. The SIP server computer of claim 23, where the SIP message section identifies one of the one or more call events as comprising a SIP request message or a SIP response message.

37. The SIP server computer of claim 36, where the SIP message section includes a service identifier field, the service identifier field uniquely identifying a service associated with a SIP message associated with the identified one of the one or more call events.

38. The SIP server computer of claim 36, where the SIP message section includes a send/receive field that includes IP addresses associated with a caller and a callee associated with the identified one of the one or more call events.

39. The SIP server computer of claim 36, where the SIP message section includes another message content field that includes additional information associated with the identified one of the one or more call events.

40. The SIP server computer of claim 23, where the XML call event file includes an event field identifying the one or more call events as occurring during a particular time period.

41. The SIP server computer of claim 23, where the document type declaration section includes information required to decode the XML call event file, and where the SIP server computer executes the third SIP application layer software module to decode the XML call event file based on the information required to decode the XML call event file.

* * * * *